US012199302B2

United States Patent
Okabayashi (10) Patent No.: US 12,199,302 B2
(45) Date of Patent: Jan. 14, 2025

(54) PRESSURE RELIEF VALVE FOR BATTERY PACK

(71) Applicant: NIFCO INC., Kanagawa-ken (JP)

(72) Inventor: Shunsuke Okabayashi, Kanagawa-ken (JP)

(73) Assignee: NIFCO INC., Kanagawa-ken (JP)

( * ) Notice: Subject to any disclaimer, the term of this patent is extended or adjusted under 35 U.S.C. 154(b) by 571 days.

(21) Appl. No.: 17/611,796

(22) PCT Filed: May 22, 2020

(86) PCT No.: PCT/JP2020/020219
§ 371 (c)(1),
(2) Date: Nov. 16, 2021

(87) PCT Pub. No.: WO2020/241466
PCT Pub. Date: Dec. 3, 2020

(65) Prior Publication Data
US 2022/0223970 A1    Jul. 14, 2022

(30) Foreign Application Priority Data
May 29, 2019    (JP) .................................. 2019-100081

(51) Int. Cl.
*H01M 50/325*    (2021.01)
*H01M 50/204*    (2021.01)
(Continued)

(52) U.S. Cl.
CPC ....... *H01M 50/325* (2021.01); *H01M 50/204* (2021.01); *H01M 50/317* (2021.01);
(Continued)

(58) Field of Classification Search
CPC .. H01M 50/325; H01M 50/204; H01M 50/35; H01M 50/317; H01M 50/333;
(Continued)

(56) References Cited

U.S. PATENT DOCUMENTS

| 5,855,225 A * | 1/1999 | Williams, III .......... F16K 15/06 137/535 |
| 2009/0224196 A1 | 9/2009 | Tanner et al. |

(Continued)

FOREIGN PATENT DOCUMENTS

| DE | 1208579 B | 1/1966 |
| EP | 3306705 A2 | 4/2018 |

(Continued)

OTHER PUBLICATIONS

International Search Report and Written Opinion for corresponding PCT Application No. PCT/JP2020/020219 dated Jul. 28, 2020.

(Continued)

*Primary Examiner* — Matthew W Van Oudenaren
(74) *Attorney, Agent, or Firm* — Tarolli, Sundheim, Covell & Tummino LLP (57) ABSTRACT

A pressure relief valve for a battery pack is attached to a port formed in a pack case of a battery pack. The pressure relief valve has a casing including a discharge hole and a valve mechanism configured to open and close the discharge hole. The discharge hole is connected to the port when the pressure relief valve is attached to the port. The pressure relief valve includes a cover attached to the casing. A passage is formed between the cover and the casing to release gas that is discharged from the discharge hole. The valve mechanism includes a valve member configured to close the discharge hole and a biasing portion that biases the valve member to a closed position where the valve member closes the discharge hole.

6 Claims, 5 Drawing Sheets

(51) Int. Cl.
  *H01M 50/317* (2021.01)
  *H01M 50/333* (2021.01)
  *H01M 50/35* (2021.01)
  *H01M 50/358* (2021.01)
  *H01M 50/367* (2021.01)

(52) U.S. Cl.
  CPC .......... *H01M 50/333* (2021.01); *H01M 50/35* (2021.01); *H01M 50/358* (2021.01); *H01M 50/367* (2021.01); *H01M 2200/20* (2013.01)

(58) Field of Classification Search
  CPC ............. H01M 50/358; H01M 50/367; H01M 2200/20; H01M 2220/20; F16K 17/0446; F16K 17/0493; F16K 17/08; F16K 17/048
  See application file for complete search history.

(56) References Cited

U.S. PATENT DOCUMENTS

| | | |
|---|---|---|
| 2010/0047673 A1 | 2/2010 | Hirakawa |
| 2012/0164500 A1 | 6/2012 | Loo et al. |
| 2020/0303700 A1 | 9/2020 | Park et al. |

FOREIGN PATENT DOCUMENTS

| | | | |
|---|---|---|---|
| JP | H03250562 A | | 11/1991 |
| JP | H04132158 A | | 5/1992 |
| JP | H09115498 A | | 5/1997 |
| JP | H09259842 A | | 10/1997 |
| JP | 2003-68268 A | | 3/2003 |
| JP | 2005-243414 A | | 9/2005 |
| JP | 2008-014474 A | | 1/2008 |
| JP | 2012-193778 A | | 10/2012 |
| JP | 2012193778 | * | 10/2012 |
| JP | 2012-221689 A | | 11/2012 |
| JP | 2016-62757 A | | 4/2016 |
| JP | 2017-073195 A | | 4/2017 |
| KR | 10-2012-0047984 A | | 5/2012 |
| KR | 10-2019-0049160 A | | 5/2019 |
| WO | 2008044430 A1 | | 4/2008 |
| WO | 2018/183804 A1 | | 10/2018 |

OTHER PUBLICATIONS

Notice of Written Opposition issued in connection with Japanese Patent No. 7059226 dated Oct. 27, 2022.
Office Action issued in connection with Chinese Application No. 202080037971.1 dated Feb. 3, 2023.
Extended European Search Report (EESR) issued for corresponding EP 20813499.9-1004/3979353 PCT/JP2020020219 issued Jun. 12, 2023.
Notice of Reasons for Revocation issued in corresponding Japanese Patent Application dated Jan. 24, 2023.

* cited by examiner

PRESSURE RELIEF VALVE FOR BATTERY PACK

RELATED APPLICATIONS

The present invention is a U.S. National Stage under 35 USC 371 patent application, claiming priority to Serial No. PCT/JP2020/020219, filed on 22 May 2020, further claiming priority from JP 2019-100081 filed on May 29, 2019; the entireties of both are incorporated herein by reference.

TECHNICAL FIELD

The present disclosure relates to a pressure relief valve for a battery pack.

BACKGROUND ART

A battery pack that accommodates batteries in a pack case is mounted on, for example, electric vehicles and hybrid vehicles. Each battery includes a pressure regulation mechanism that releases gas from the battery to maintain the pressure in the battery within a predetermined range. The pack case includes a port and a pressure relief valve arranged in the port. The port prevents the pressure from being raised excessively high by the gas emitted from the batteries. The pressure relief valve opens when the difference in pressure between the inner side and outer side of the pack case reaches a predetermined pressure difference (refer to, for example, Patent Document 1).

The pressure relief valve described in the above document includes a film-like sheet member and a reinforcement plate. Fine holes extend through the reinforcement plate. The sheet member and the reinforcement plate cover the port of the pack case in a state arranged one upon the other.

PRIOR ART DOCUMENT

Patent Document

Patent Document 1: Japanese Laid-Open Patent Publication No. 2017-73195

SUMMARY OF THE INVENTION

Problems that the Invention is to Solve

When the amount of gas expected to be released from the pack case increases as the number of batteries increases in the pack case, it is desirable that the port of the pack case be enlarged in diameter. However, when the port is enlarged in diameter and the sheet member is enlarged accordingly, the sheet member may bend and adversely affect the seal of the pressure relief valve.

It is an objective of the present disclosure to provide a pressure relief valve for a battery pack that obtains a high sealing capability regardless of the diameter of the port formed in the battery pack.

Means for Solving the Problem

One aspect of the present disclosure provides a pressure relief valve for a battery pack. The pressure relief valve is configured to be attached to a port formed in a pack case of a battery pack. The pressure relief valve includes a casing including a discharge hole and a valve mechanism configured to open and close the discharge hole. The discharge hole is connected to the port when the pressure relief valve is attached to the port. The pressure relief valve includes a cover attached to the casing. A passage is formed between the cover and the casing to release gas that is discharged from the discharge hole. The valve mechanism includes a valve member configured to close the discharge hole and a biasing portion that biases the valve member to a closed position where the valve member closes the discharge hole.

MODES FOR CARRYING OUT THE INVENTION

A pressure relief valve for a battery pack according to one embodiment will now be described.

Figure 1:
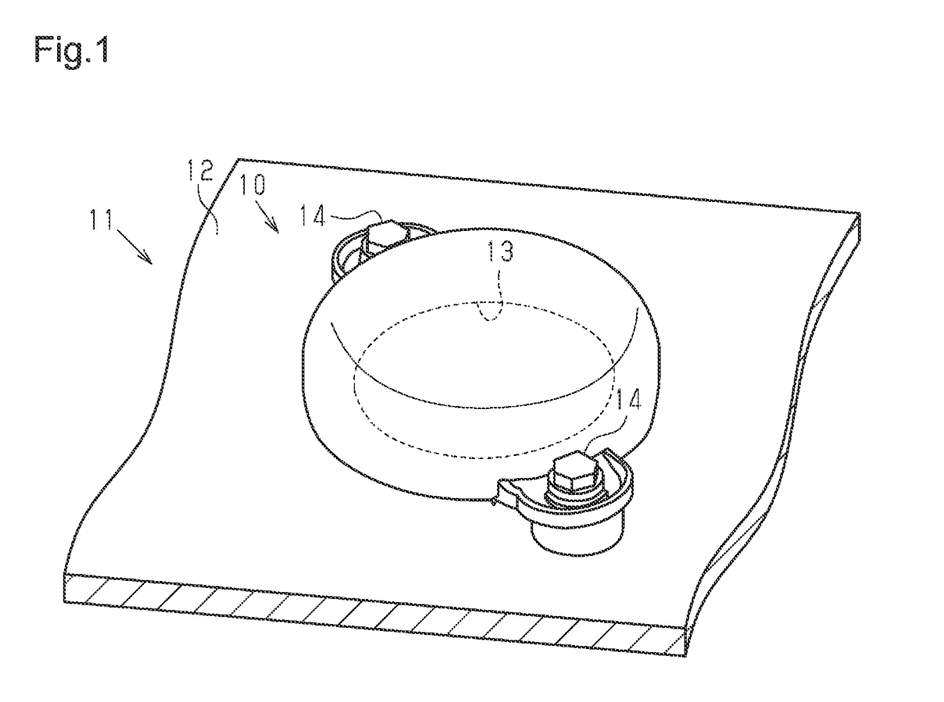
FIG. 1 is a perspective view showing a pressure relief valve for a battery pack according to one embodiment attached to a pack case of the battery pack.

As shown in FIG. 1, the pressure relieve valve for a battery pack (hereafter, referred to as the pressure relief valve 10) is attached to a pack case 12 of a battery pack 11. The battery pack 11 includes batteries (not shown) in the pack case 12. Each battery includes battery elements, such as a positive electrode and a negative electrode, in a battery case. A pressure regulation mechanism, such as a valve device, is arranged in the battery case to release gas from the battery case when the pressure in the battery case becomes excessively high. The gas discharged from the battery case by the pressure regulation mechanism fills the pack case 12. The pack case 12 includes a port 13 through which gas is discharged out of the pack case 12.

The pressure relief valve 10 opens and closes the port 13 of the pack case 12. Under atmospheric pressure, the pressure relief valve 10 releases gas from the pack case 12 when the pressure in the pack case 12 reaches a set upper limit pressure. The pressure relief valve 10 is attached and fastened to the pack case 12 by fasteners 14 such as bolts.

Figure 2:
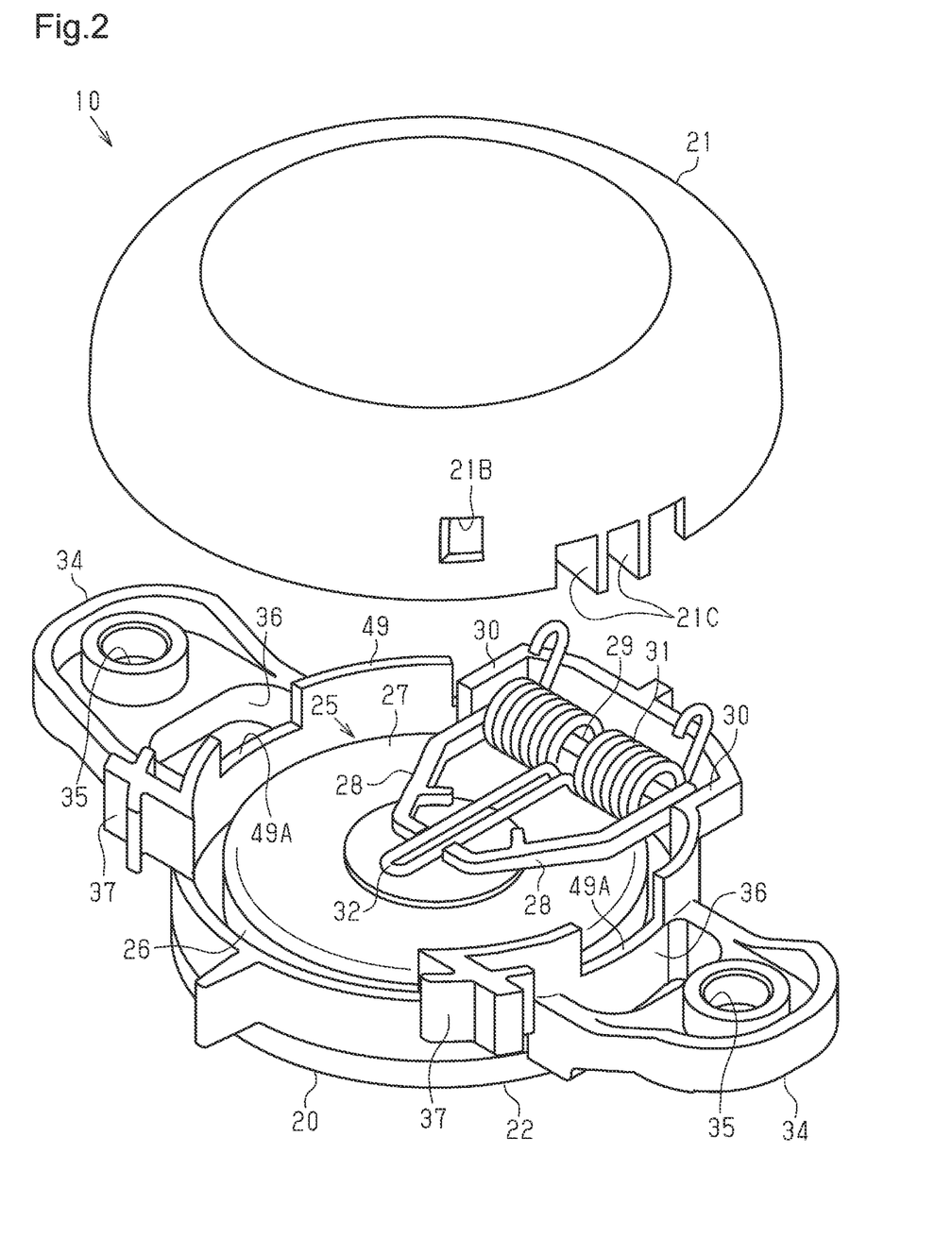
FIG. 2 is an exploded perspective view of the pressure relieve valve in accordance with the embodiment of FIG. 1.

As shown in FIG. 2, the pressure relief valve 10 includes a casing 20 and a cover 21. The casing 20 includes a casing body 22 that is circular as viewed from the cover 21. The casing body 22 includes a discharge hole 23 (refer to FIG. 3) connected to the port 13 of the pack case 12.

Further, the casing 20 includes a valve mechanism 25 that opens and closes the discharge hole 23. The valve mechanism 25 includes a valve seat 26, surrounding the discharge hole 23, and a flap type valve member 27. The valve member 27 has the form a disc. Two arms 28 extend radially outward from a central portion of the valve member 27 on the surface of the valve member 27. A shaft hole (not shown) extends through the proximal end of each arm 28, and one of two ends of a rotational shaft 29 is inserted through the shaft hole. The two ends of the rotational shaft 29 are rotatably supported by a shaft support 30 formed in the casing 20.

A biasing portion 31 is supported by the casing body 22. The biasing portion 31 is a double torsion spring that is a combination of two torsion coil springs. The biasing portion 31 includes an extension 32 that extends from between the two torsion coil springs. The distal end of the extension 32 is fixed to the central part of the valve member 27 to apply the biasing force of the biasing portion 31 to the valve member 27.

When the pressure in the pack case 12 reaches a set upper limit pressure, the valve member 27 is pivoted about the proximal ends of the arms 28, which are supported by the shaft support 30, against the biasing force of the biasing portion 31. This separates part of the valve member 27 from the valve seat 26 and releases gas from the pack case 12 through the discharge hole 23.

Further, the casing 20 includes two fastening portions 34. The casing 20 includes the casing body 22 and the two fastening portions 34 that are connected to the casing body 22 and located at the outer side of the casing body 22. The two fastening portions 34 are positioned to be symmetric in the radial direction with respect to the center of the casing body 22. The fastening portions 34 each include a fastening hole 35, into which the corresponding fastener 14 is inserted, and a connection hole 36, which serves as a discharge passage. The fastening hole 35 receives the corresponding fastener 14 that fixes the casing 20 to the pack case 12. The connection hole 36 is closer to the casing body 22 than the fastening hole 35. That is, the connection hole 36 is located between the casing body 22 and the fastening hole 35. The cover 21 covers the connection hole 36. Further, the casing body 22 includes a circumferential wall 49 surrounding the valve mechanism 25. The circumferential wall 49 includes cutaway portions 49A at parts corresponding to the fastening portions 34.

The casing body 22 also includes engagement pieces 37 that are press-fitted into receptacles 21B formed in the cover 21. The engagement pieces 37 are press-fitted into the receptacles 21B of the cover 21 to position the cover 21 relative to the casing 20 in the circumferential direction.

Figure 3:
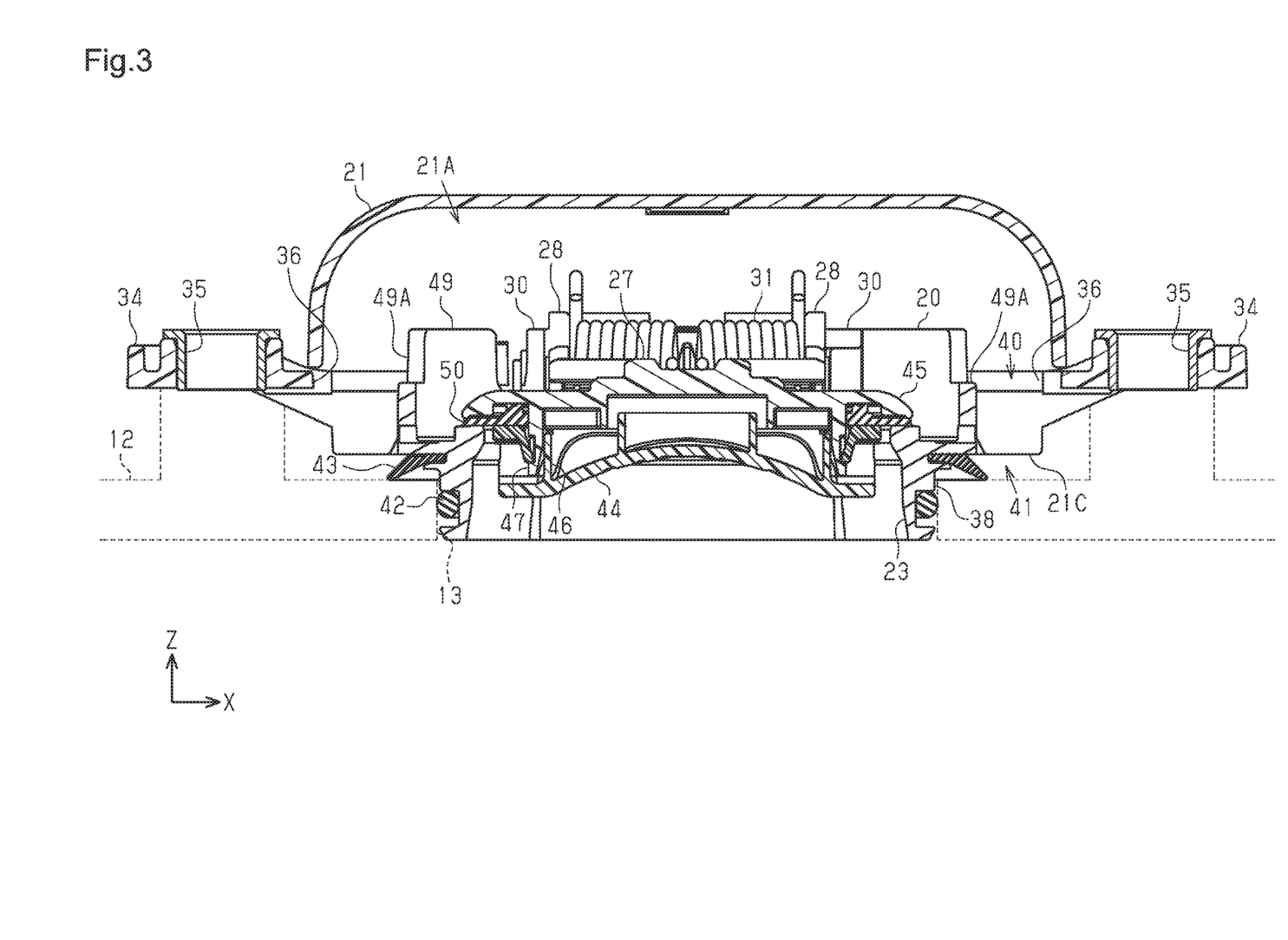
FIG. 3 is a cross-sectional view of the pressure relieve valve in accordance with the embodiment of FIG. 1.

As shown in FIG. 3, the cover 21 includes an accommodation compartment 21A that accommodates the casing 20 excluding the fastening portions 34. As shown in FIG. 3, the cover 21 has a lower end that is open in a direction opposite to a Z-direction. The outer diameter of the casing body 22, excluding the fastening portions 34, is smaller than the inner diameter of the cover 21. This forms a gap between the cover 21 and the casing 20. The gap defines a passage 40 through which gas passes. The cover 21 includes a bottom end 21C inserted into the connection holes 36. Gaps 41 are formed between the bottom end 21C of the cover 21 and the surface of the pack case 12 so that the gas passed through the passage 40 is discharged out of the pressure relief valve 10 via the gaps 41. The gaps 41 are located between the fastening portions 34 and the pack case 12.

The casing 20 includes a coupling portion 38 inserted into the port 13 of the pack case 12. The coupling portion 38 is cylindrical and includes the discharge hole 23 at its inner side. A first seal member 42 and a second seal member 43 are arranged on the outer circumferential surface of the coupling portion 38. The first seal member 42 has a circular cross section and is disposed between the casing 20 and the inner circumferential surface of the port 13 of the pack case 12. The second seal member 43 contacts the surface of the pack case 12 when the pressure relief valve 10 is attached to the pack case 12.

The valve member 27 is formed by combining a first valve body 44 and a second valve body 45. The first valve body 44 and the second valve body 45 are coupled by fitting a fitting portion 46 of the first valve body 44 into a fitted portion 47 of the second valve body 45. An annular third seal member 50 is disposed between the first valve body 44 and the second valve body 45.

Figure 4:
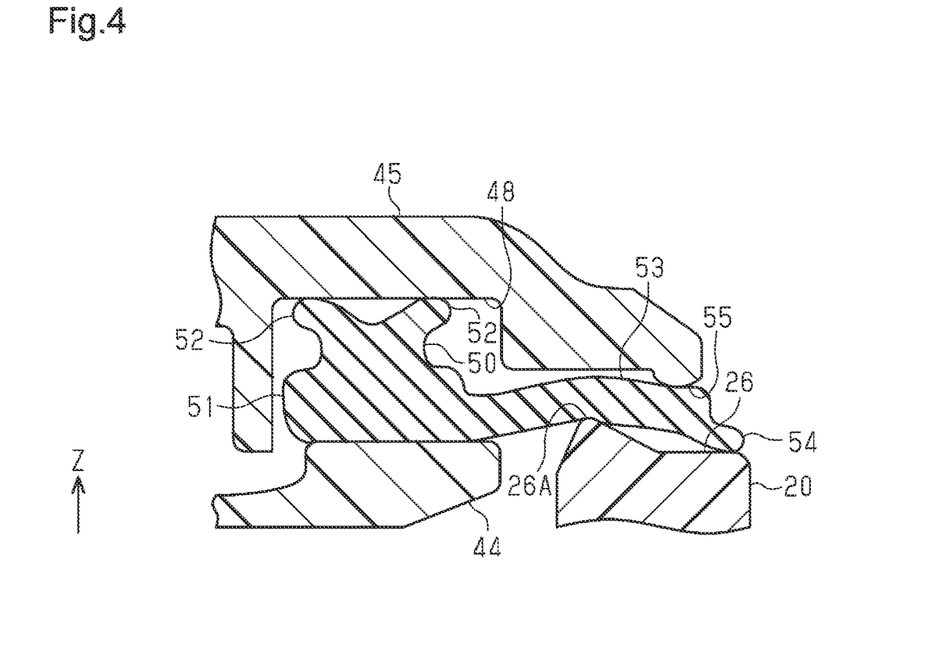
FIG. 4 is a cross-sectional view of a valve member in the pressure relieve valve in accordance with the embodiment of FIG. 1.

With reference to FIG. 4, the third seal member 50 will now be described in detail. The third seal member 50 includes an inner end 51 accommodated in a groove 48 of the second valve body 45. The end 51 includes two lips 52. The lips 52 are pressed against the second valve body 45. Further, the third seal member 50 includes an outer end 53 disposed between the second valve body 45 and a projection 26A of the valve seat 26 when the pressure relief valve 10 closes. The end 53 of the third seal member 50 includes a sub-lip 54. The sub-lip 54 extends outward from the second valve body 45 and closes the space between the valve member 27 and the casing 20 to limit the entry of dust into the valve member 27.

An annular rib 55, which serves as a projection, is formed on the rim of the second valve body 45. The annular rib 55 is arranged at a position located outward from the projection 26A in the radial direction of the discharge hole 23. As shown in FIG. 4, the annular rib 55 projects in the direction opposite to the Z-direction. As shown in FIG. 4, the annular rib 55 contacts the third seal member 50 and presses the third seal member 50 from the side opposite to the projection 26A, which is projected in the Z-direction. Thus, when the valve member 27 is located at the closed position, pressing force is applied from two locations to the third seal member 50 between the valve seat 26 and the second valve body 45. The separated locations where pressing force is applied to the third seal member 50 lowers the planar pressure produced by contact of the third seal member 50 and the valve seat 26.

Figure 5:
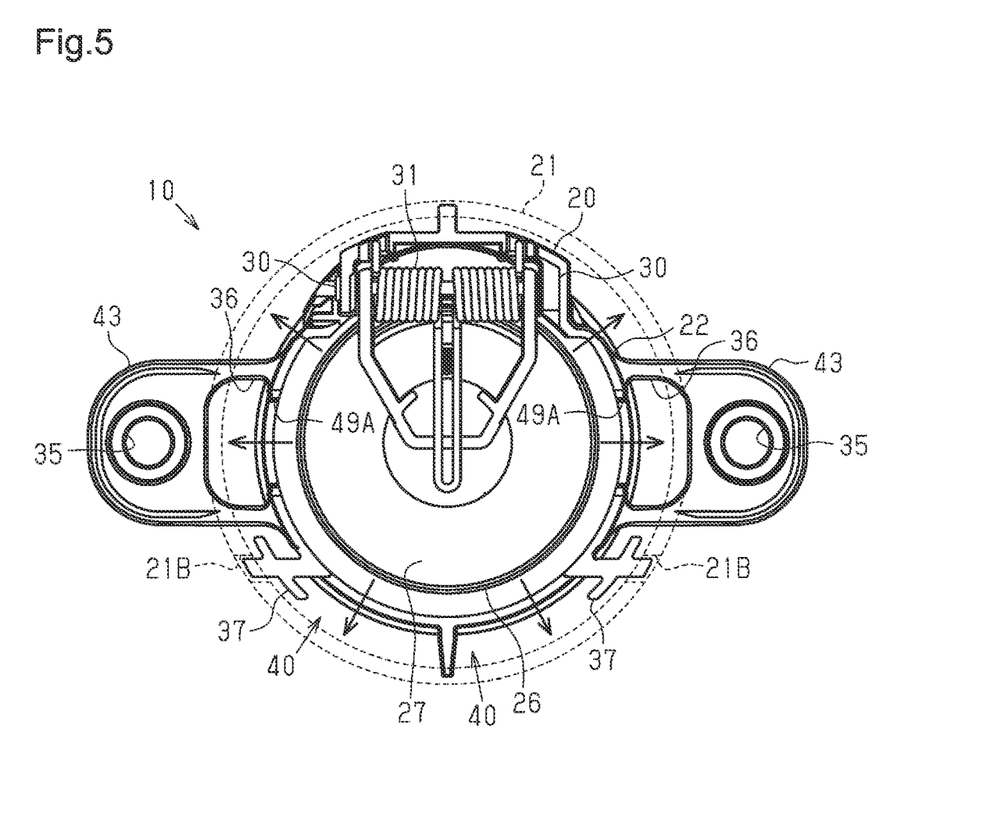
FIG. 5 is a plan view showing the pressure relieve valve in accordance with the embodiment of FIG. 1 in an open state.

The operation of the pressure relief valve 10 will now be described with reference to FIGS. 5 and 6. The broken lines shown in FIG. 5 represent the cover 21. The passage 40 is formed between the entire outer circumferential surface of the casing 20, excluding the fastening portions 34, and the inner circumferential surface of the cover 21. Thus, when the internal pressure of the pack case 12 reaches the upper limit pressure and opens the valve member 27, gas spreads out radially from the pack case 12 through the discharge hole 23, as shown by the arrows in FIG. 5, and passes through the passage 40 before flowing out. The gas flowing toward the fastening portions 34 passes through the cutaway portions 49A and enters the connection holes 36.

Figure 6:
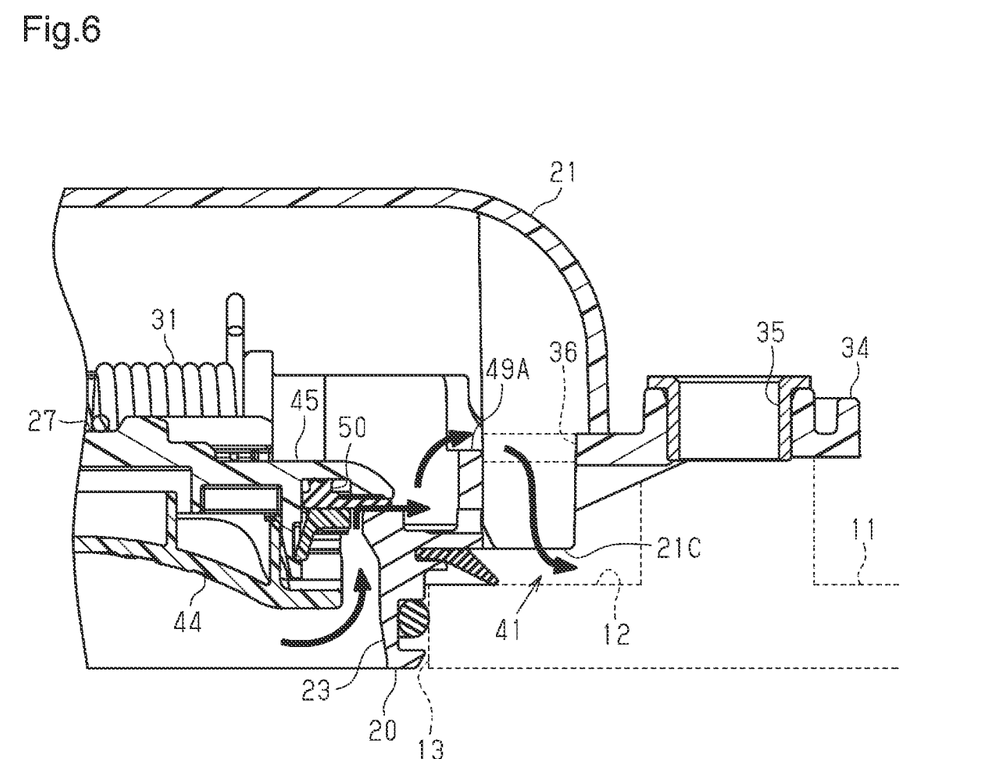
FIG. 6 is a cross-sectional view showing the pressure relieve valve in accordance with the embodiment of FIG. 1 in an open state.

As shown in FIG. 6, the gas passed through the connection hole 36 passes through the gaps 41 between the fastening portions 34 and the pack case 12 and then flows out of the pressure relief valve 10. As the open valve mechanism 25 lowers the internal pressure of the pack case 12 to less than the predetermined upper limit pressure, the biasing force of the biasing portion 31 acts to have the valve member 27 contact the valve seat 26.

The above embodiment has the advantages described below.

(1) In the above embodiment, the pressure relief valve 10 biases the valve member 27 to the closed position with the biasing portion 31. Thus, the above embodiment increases the sealing capability when the valve member 27 is located at the closed position as compared with when the port 13 is closed with a film-like valve member. Further, the cover 21, which is arranged on the casing 20, limits the entry of dust into the pack case 12 when the valve mechanism 25 opens.

In the pressure relief valve 10, which arranges the cover 21 on the casing 20, the passage 40 that discharges gas is formed between the inner circumferential surface of the cover 21 and the outer circumferential surface of the casing body 22. This lowers the flow resistance in the passage 40 from the port 13 of the pack case 12 to the outside of the pressure relief valve 10. Thus, gas will flow out smoothly even when the port 13 of the pack case 12 is enlarged in diameter to increase the maximum amount of gas that can be discharged from the port 13.

(2) In the above embodiment, in addition to the passage 40 between the casing 20 and the cover 21, the fastening portions 34 include the connection holes 36 to discharge gas. Thus, in the above embodiment, the fastening portions 34 further lowers the flow resistance.

(3) In the above embodiment, the gas that passes through the connection holes 36 further passes through the gaps 41 between the fastening portions 34 and the pack case 12 before flowing out. This lowers the flow resistance acting on the gas discharged from the discharge hole 23.

(4) In the above embodiment, when the valve member 27 is located at the closed position, the third seal member 50 contacts both of the valve seat 26 and the annular rib 55, which is located farther from the discharge hole 23 than the valve seat 26. This lowers the planar pressure produced when the third seal member 50 contacts the valve seat 26. Thus, even when the valve member 27 is located at the closed position over a long period of time, the third seal member 50 will not become stuck to the valve seat 26 or the like.

(5) In the above embodiment, the passage 40 for gas is formed over the entire circumference of the casing body 22, excluding the fastening portions 34. This lowers the flow resistance when gas passes through the passage 40.

OTHER EMBODIMENTS

The present embodiment may be modified as described below. The present embodiment and the following modifications can be combined as long as there is no technical contradiction.

In the above embodiment, the passage 40 is formed by the cover 21 and the entire outer circumference of the casing body 22, excluding the fastening portions 34. Instead, the passage 40 can correspond to a section smaller than the entire outer circumference of the casing body 22, excluding the fastening portions 34. Further, when the fastening portions 34 are arranged at locations separated from the outer circumferential surface of the casing body 22, the passage 40 may be formed by the cover 21 and the entire outer circumference of the casing body 22.

In the above embodiment, the valve member 27 includes the annular rib 55 that presses the end 53 of the third seal member 50. However, the annular rib 55 may be omitted if sticking of the third seal member 50 to the valve seat 26 or the like can be avoided by adjusting the biasing force of the biasing portion 31. Alternatively, instead of, or in addition to, the annular rib 55, a non-sticking treatment may be performed on the third seal member 50 or at least one of the valve member 27 and the valve seat 26 to avoid the third seal member 50 sticking to the valve seat 26 or the like.

In the above embodiment, the lower end of the cover 21 attached to the casing 20 is separated from the pack case 12 so that gas passes through the connection holes 36 and then flow out from the lower end of the cover 21. Instead, or in addition, the casing 20 or the cover 21 may include a hole for passage of the gas.

In the above embodiment, the discharge passages formed in the fastening portions 34 correspond to the connection holes 36 extending through the fastening portions 34. Instead, a discharge passage may be formed by gaps or the like between the fastening portions 34 and the cover 21.

In the above embodiment, the fastening portions 34 include the connection holes 36. However, the connection holes 36 may be omitted from the fastening portions 34. Even in this case, the passage 40 is still formed at parts excluding the fastening portions 34. Thus, the flow resistance of the passage can be lowered as the gas discharged from the pack case 12 passes.

In the above embodiment, the valve member 27 is formed by the first valve body 44 and the second valve body 45. Instead, the valve member 27 may be formed by a single element, and the valve member 27 may be attached to the third seal member 50.

The invention claimed is:

1. A pressure relief valve for a battery pack, wherein the pressure relief valve is configured to be attached to a port formed in a pack case of a battery pack, the pressure relief valve comprising:
   a casing including a discharge hole and a valve mechanism configured to open and close the discharge hole, wherein the discharge hole is connected to the port when the pressure relief valve is attached to the port; and
   a cover attached to the casing, wherein a first passage is formed between the cover and the casing to release gas that is discharged from the discharge hole,
   wherein the valve mechanism includes a valve member configured to close the discharge hole and a biasing portion that biases the valve member to a closed position where the valve member closes the discharge hole,
   the casing including a casing body and a fastening portion that is connected to the casing body and located at an outer side of the casing body, the fastening portion including a fastening hole configured to receive a fastener that fixes the casing to the pack case and a discharge passage that releases gas discharged from the discharge hole, and wherein the discharge passage is located between the casing body and the fastening hole.

2. The pressure relief valve according to claim 1, wherein the discharge passage is a connection hole extending through the fastening portion; and when the pressure relief valve is attached to the port, a gap is formed between the fastening portion and the pack case so that gas passed through the connection hole is released from the pressure relief valve via the gap.

3. The pressure relief valve according to claim 1, further comprising:
   a seal member that contacts a valve seat surrounding the discharge hole when the valve member is located at the closed position,
   wherein the valve member includes a projection that presses a distal end of the seal member, and the projection is located farther from the discharge hole than the valve seat.

4. The pressure relief valve according to claim 1, wherein the first passage is formed between an entire circumferential surface of the casing body, excluding the fastening portion, and an inner circumferential surface of the cover.

5. The pressure relief valve according to claim 1, wherein the cover covers the discharge passage.

6. The pressure relief valve according to claim 1, wherein the cover includes a bottom end inserted into the discharge passage; and when the pressure relief valve is attached to the port, a gap is formed between the bottom end of the cover and the pack case so that gas passed through the discharge passage is released from the pressure relief valve via the gap.

* * * * *